United States Patent
Kupratis et al.

(10) Patent No.: US 10,030,586 B2
(45) Date of Patent: Jul. 24, 2018

(54) GEARED TURBOFAN GAS TURBINE ENGINE ARCHITECTURE

(71) Applicant: United Technologies Corporation, Hartford, CT (US)

(72) Inventors: Daniel Bernard Kupratis, Wallingford, CT (US); Frederick M. Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 155 days.

(21) Appl. No.: 14/789,300

(22) Filed: Jul. 1, 2015

(65) Prior Publication Data
US 2015/0330302 A1    Nov. 19, 2015

Related U.S. Application Data

(63) Continuation-in-part of application No. PCT/US2013/023559, filed on Jan. 29, 2013, which
(Continued)

(51) Int. Cl.
*F02C 7/36* (2006.01)
*F02K 3/072* (2006.01)
(Continued)

(52) U.S. Cl.
CPC .......... *F02C 7/36* (2013.01); *F01D 5/06* (2013.01); *F01D 9/02* (2013.01); *F01D 9/065* (2013.01);
(Continued)

(58) Field of Classification Search
CPC .. F02C 3/107; F02C 3/36; F01D 9/065; F02K 3/04; F02K 3/06; F02K 3/072
See application file for complete search history.

(56) References Cited

U.S. PATENT DOCUMENTS

| | | | |
|---|---|---|---|
| 2,608,821 | A | 9/1952 | Hunsaker |
| 2,748,623 | A | 6/1956 | Hill |

(Continued)

FOREIGN PATENT DOCUMENTS

| | | |
|---|---|---|
| EP | 1712738 A2 | 10/2006 |
| EP | 2071153 A2 | 6/2009 |
| GB | 1516041 | 6/1978 |
| GB | 2041090 | 9/1980 |
| WO | 2007038674 | 4/2007 |
| WO | 2013/116257 A1 | 8/2013 |

OTHER PUBLICATIONS

European Search Report for European Patent Application No. 13786893.1 completed Oct. 12, 2015.
(Continued)

*Primary Examiner* — Steven Sutherland
(74) *Attorney, Agent, or Firm* — Carlson, Gaskey & Olds, P.C.

(57) ABSTRACT

A gas turbine engine typically includes a fan section, a compressor section, a combustor section and a turbine section. A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a speed different than the turbine section such that both the turbine section and the fan section can rotate at closer to optimal speeds providing increased performance attributes and performance by desirable combinations of the disclosed features of the various components of the described and disclosed gas turbine engine.

15 Claims, 13 Drawing Sheets

Related U.S. Application Data is a continuation of application No. 13/645,606, filed on Oct. 5, 2012, now Pat. No. 8,935,913, which is a continuation-in-part of application No. 13/363,154, filed on Jan. 31, 2012, now abandoned.

(60) Provisional application No. 61/653,745, filed on May 31, 2012.

(51) Int. Cl.

| | |
|---|---|
| *F02K 3/04* | (2006.01) |
| *F02K 3/06* | (2006.01) |
| *F02C 3/107* | (2006.01) |
| *F02C 3/36* | (2006.01) |
| *F01D 9/06* | (2006.01) |
| *F02C 7/06* | (2006.01) |
| *F01D 5/06* | (2006.01) |
| *F01D 9/02* | (2006.01) |
| *F02C 3/04* | (2006.01) |
| *F02C 9/18* | (2006.01) |
| *F02K 1/78* | (2006.01) |
| *F04D 27/00* | (2006.01) |
| *F04D 29/32* | (2006.01) |

(52) U.S. Cl.
CPC ............... *F02C 3/04* (2013.01); *F02C 3/107* (2013.01); *F02C 3/36* (2013.01); *F02C 7/06* (2013.01); *F02C 9/18* (2013.01); *F02K 1/78* (2013.01); *F02K 3/04* (2013.01); *F02K 3/06* (2013.01); *F02K 3/072* (2013.01); *F04D 27/009* (2013.01); *F04D 29/325* (2013.01); *F05D 2220/32* (2013.01); *F05D 2220/323* (2013.01); *F05D 2240/12* (2013.01); *F05D 2240/35* (2013.01); *F05D 2240/60* (2013.01); *F05D 2260/4031* (2013.01); *F05D 2260/40311* (2013.01); *Y02T 50/671* (2013.01)

(56) References Cited

U.S. PATENT DOCUMENTS

| | | | |
|---|---|---|---|
| 3,033,002 | A | 5/1962 | Davis |
| 3,111,005 | A | 11/1963 | Howell et al. |
| 3,287,906 | A | 11/1966 | McCormick |
| 3,526,092 | A | 9/1970 | Steel |
| 3,620,020 | A | 11/1971 | Halliwell et al. |
| 3,673,802 | A | 7/1972 | Krebs et al. |
| 3,713,748 | A | 1/1973 | Langley |
| 3,729,957 | A | 5/1973 | Petrie et al. |
| 3,747,343 | A | 7/1973 | Rosen |
| 3,754,484 | A | 8/1973 | Roberts |
| 3,861,139 | A | 1/1975 | Jones |
| 3,892,358 | A | 7/1975 | Gisslen |
| 4,005,575 | A | 2/1977 | Scott et al. |
| 4,130,872 | A | 12/1978 | Harloff |
| 4,463,553 | A | 8/1984 | Boudigues |
| 4,660,376 | A | 4/1987 | Johnson |
| 4,809,498 | A | 3/1989 | Giffin, III et al. |
| 4,827,712 | A | 5/1989 | Coplin |
| 5,074,109 | A | 12/1991 | Mandet et al. |
| 5,307,622 | A | 5/1994 | Ciokajlo et al. |
| 5,433,674 | A | 7/1995 | Sheridan et al. |
| 5,447,411 | A | 9/1995 | Curley et al. |
| 5,524,847 | A | 6/1996 | Brodell et al. |
| 5,778,659 | A | 7/1998 | Duesler et al. |
| 5,857,836 | A | 1/1999 | Stickler et al. |
| 5,915,917 | A | 6/1999 | Eveker et al. |
| 5,971,706 | A | 10/1999 | Glista et al. |
| 5,975,841 | A | 11/1999 | Lindemuth et al. |
| 6,223,616 | B1 | 5/2001 | Sheridan |
| 6,318,070 | B1 | 11/2001 | Rey et al. |
| 6,339,927 | B1 | 1/2002 | DiPietro, Jr. |
| 6,378,308 | B1 | 4/2002 | Pfluger |
| 6,381,948 | B1 | 5/2002 | Klingels |
| 6,619,030 | B1 | 9/2003 | Seda et al. |
| 6,669,393 | B2 | 12/2003 | Schilling |
| 6,708,482 | B2 | 3/2004 | Seda |
| 6,732,502 | B2 | 5/2004 | Seda et al. |
| 6,814,541 | B2 | 11/2004 | Evans et al. |
| 7,021,042 | B2 | 4/2006 | Law |
| 7,219,490 | B2 | 5/2007 | Dev |
| 7,409,819 | B2 | 8/2008 | Henry |
| 7,513,103 | B2 | 4/2009 | Orlando et al. |
| 7,591,754 | B2 | 9/2009 | Duong et al. |
| 7,594,404 | B2 | 9/2009 | Somanath et al. |
| 7,600,370 | B2 | 10/2009 | Dawson |
| 7,632,064 | B2 | 12/2009 | Somanath et al. |
| 7,685,808 | B2 | 3/2010 | Orlando et al. |
| 7,694,505 | B2 | 4/2010 | Schilling |
| 7,716,914 | B2 | 5/2010 | Schilling |
| 7,765,786 | B2 | 8/2010 | Klingels et al. |
| 7,824,305 | B2 | 11/2010 | Duong et al. |
| 7,832,193 | B2 | 11/2010 | Orlando et al. |
| 7,882,693 | B2 | 2/2011 | Schilling |
| 7,926,259 | B2 | 4/2011 | Orlando et al. |
| 7,926,260 | B2 | 4/2011 | Sheridan et al. |
| 8,015,828 | B2 | 9/2011 | Moniz et al. |
| 8,061,969 | B2 | 11/2011 | Durocher et al. |
| 8,083,472 | B2 | 12/2011 | Maguire |
| 8,091,371 | B2 | 1/2012 | Durocher et al. |
| 8,191,352 | B2 | 6/2012 | Schilling |
| 8,205,432 | B2 | 6/2012 | Sheridan |
| 8,834,099 | B1 | 9/2014 | Topol et al. |
| 2003/0163983 | A1 | 9/2003 | Seda et al. |
| 2003/0163984 | A1 | 9/2003 | Seda et al. |
| 2005/0279100 | A1 | 12/2005 | Graziosi et al. |
| 2006/0101804 | A1 | 5/2006 | Stretton |
| 2006/0130456 | A1 | 6/2006 | Suciu et al. |
| 2006/0179818 | A1 | 8/2006 | Merchant |
| 2006/0288686 | A1 | 12/2006 | Cherry et al. |
| 2007/0022735 | A1 | 2/2007 | Henry et al. |
| 2007/0084189 | A1 | 4/2007 | Moniz et al. |
| 2007/0087892 | A1 | 4/2007 | Orlando et al. |
| 2008/0022653 | A1 | 1/2008 | Schilling |
| 2008/0098714 | A1 | 5/2008 | Orlando et al. |
| 2008/0098718 | A1 | 5/2008 | Henry et al. |
| 2008/0148881 | A1 | 6/2008 | Moniz et al. |
| 2009/0056306 | A1 | 3/2009 | Suciu et al. |
| 2009/0056343 | A1 | 3/2009 | Suciu et al. |
| 2009/0080700 | A1 | 3/2009 | Lau et al. |
| 2009/0090096 | A1 | 4/2009 | Sheridan |
| 2009/0145102 | A1 | 6/2009 | Roberge et al. |
| 2009/0229242 | A1 | 9/2009 | Schwark |
| 2009/0245997 | A1 | 10/2009 | Hurwitz et al. |
| 2009/0288384 | A1 | 11/2009 | Granitz et al. |
| 2010/0005810 | A1 | 1/2010 | Jarrell et al. |
| 2010/0080700 | A1 | 4/2010 | Venter |
| 2010/0126141 | A1 | 5/2010 | Schilling |
| 2010/0132376 | A1 | 6/2010 | Durocher et al. |
| 2010/0148396 | A1 | 6/2010 | Xie et al. |
| 2010/0326050 | A1 | 12/2010 | Schilling et al. |
| 2010/0331139 | A1 | 12/2010 | McCune |
| 2012/0017603 | A1 | 1/2012 | Bart et al. |
| 2013/0192200 | A1 | 8/2013 | Kupratis et al. |
| 2013/0192201 | A1 | 8/2013 | Kupratis et al. |
| 2013/0192266 | A1 | 8/2013 | Houston et al. |
| 2013/0255219 | A1 | 10/2013 | Schwarz et al. |
| 2013/0259654 | A1 | 10/2013 | Kupratis et al. |
| 2013/0283819 | A1 | 10/2013 | Schwarz et al. |
| 2014/0109548 | A1 | 4/2014 | Virkler |
| 2014/0271135 | A1 | 9/2014 | Sheridan et al. |
| 2015/0089959 | A1 | 4/2015 | Merry et al. |

OTHER PUBLICATIONS

Mattingly, Jack D. "Aircraft Engine Design," 2002, American Institute of Aeronautics and Astronautics, 2nd Edition, p. 290-293.
Singapore Search Report and Written Opinion for Singapore Patent Application No. 11201403011R completed Nov. 17, 2015.

(56) References Cited

OTHER PUBLICATIONS

Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida.
Agarwal, B.D and Broutman, L.J. (1990). Analysis and performance of fiber composites, 2nd Edition. John Wiley & Sons, Inc. New York: New York.
Carney, K., Pereira, M. Revilock, and Matheny, P. Jet engine fan blade containment using two alternate geometries. 4th European LS-DYNA Users Conference.
Brines, G.L. (1990). The turbofan of tomorrow. Mechanical Engineering: The Journal of the American Society of Mechanical Engineers, 108(8), 65-67.
Faghri, A. (1995). Heat pipe and science technology. Washington, D.C.: Taylor & Francis.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979.
Horikoshi, S. and Serpone, N. (2013). Introduction to nanoparticles. Microwaves in nanoparticle synthesis. Wiley-VCH Verlag GmbH & Co. KGaA.
Kerrebrock, J.L. (1977). Aircraft engines and gas turbines. Cambridge, MA: The MIT Press.
Xie, M. (2008). Intelligent engine systems: Smart case system. NASA/CR-2008-215233.
Knip, Jr., G. (1987). Analysis of an advanced technology subsonic turbofan incorporating revolutionary materials. NASA Technical Memorandum. May 1987.
Willis, W.S. (1979). Quiet clean short-haul experimental engine (QCSEE) final report. NASA/CR-159473.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press.
Ramsden, J.M. (Ed). (1978). The new European airliner. Flight International, 113(3590). Jan. 7, 1978.
Langston, L. and Faghri, A. Heat pipe turbine vane cooling. Prepared for Advanced Turbine Systems Annual Program Review. Morgantown, West Virginia. Oct. 17-19, 1995.
Oates, G.C. (Ed). (1989). Aircraft propulsion systems and technology and design. Washington, D.C.: American Institute of Aeronautics, Inc.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc.
Pyrograf-III Carbon Nanofiber. Product guide. Retrieved from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc.
Ratna, D. (2009). Handbook of thermoset resins. Shawbury, UK: iSmithers.
Wendus, B.E., Stark, D.F., Holler, R.P., and Funkhouser, M.E. (2003). Follow-on technology requirement study for advanced subsonic transport. NASA/CR-2003-212467.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.
Dickey, T.A. and Dobak, E.R. (1972). The evolution and development status of ALF 502 turbofan engine. National Aerospace Engineering and Manufacturing Meeting. San Diego, California. Oct. 2-5, 1972.
Gunston, B. (Ed.) (2000). Jane's aero-engines, Issue seven. Coulsdon, Surrey, UK: Jane's Information Group Limited.
Ivchenko-Progress D-436. Jane's Aero-engines, Aero-engines- Turbofan. Feb. 8, 2012.
Ivchenko-Progress AI-727M. Jane's Aero-engines, Aero-engines-Turbofan. Nov. 27, 2011.
Ivchenko-Progress D-727. Jane's Aero-engines, Aero-engines- Turbofan. Feb. 7, 2007.
Turbomeca Aubisque. Jane's Aero-engines, Aero-engines- Turbofan. Nov. 2, 2009.
Aviadvigatel D-110. Jane's Aero-engines, Aero-engines- Turbofan. Jun. 1, 2010.
Rolls-Royce M45H. Jane's Aero-engines, Aero-engines- Turbofan. Feb. 24, 2010.
Honeywell LF502. Jane's Aero-engines, Aero-engines- Turbofan. Feb. 9, 2012.
Honeywell LF507. Jane's Aero-engines, Aero-engines- Turbofan. Feb. 9, 2012.
Honeywell TFE731. Jane's Aero-engines, Aero-engines- Turbofan. Jul. 18, 2012.
NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L, Haller, W.J., Tong, M. T., and Thurman, D.R. (2011). Refined exploration of turbofan design options for an advanced single-aisle transport. NASA/TM-2011-216883.

(56) References Cited

OTHER PUBLICATIONS

Zalud, T. (1998). Gears put a new spin on turbofan performance. Machine Design, 70(20), p. 104.

Search Report and Written Opinion for Singapore Application No. 11201402824R dated Apr. 19, 2016.

European Search Report for EP Application No. 16161464.9 dated Jul. 22, 2016.

European Search Report for EP Application No. 16161484.7 dated Jul. 22, 2016.

Sabnis, Jayant et al. "The PW1000G Pure Power New Engine Concept and Its Impact on MRO" Av Week Engine MRO Forum, Dec. 1, 2010, pp. 1-45.

Schaber, Reinhold, "Numerische Auslegung and Simulation von Gasturbinen" Dec. 14, 2000.

European Search Report for European Application No. 16174322.4 dated Nov. 18, 2016.

Jane's Aero-Engines, Issue Seven, Copyright 2000, pp. 510-512.

Baskharone, Erian, "Principles of Turbomachinery of Air-Breathing Engines," 2006, Cambridge University Press, pp. 261-263.

Kandebo, Stanley, "Geared-Turbofan Engine Design Targets Cost, Complexity", Feb. 23, 1998, Aviation Week & Space Technology, vol. 148, Issue 8.

Nagendra, S., "Optimal rapid multidisciplinary response networks: Rapiddisk". 2005, Stuct Multdick Optim 29, 213-231.

Ciepluch et al., "Quiet, Powered-Lift Propulsion", NASA Conference Publication 2077, Nov. 14-15, 1978.

Sessions, Ron, "Turbo Hydra-Matic 350 Handbook", 1985, The Berkley Publishing Group, pp. 24-25.

Article—"Gas Power Cycle—Jet Propulsion Technology, a Case Study," from MachineDesign.com website.

Article—"Gears Put a New Spin on Turbofan Performance," printed from MachineDesign.com website.

Notice of Opposition to U.S. Pat. No. 2,809,931. United Technologies Corporation opposed by Safran Aircraft Engines, dated Apr. 20, 2017.

Extended European Search Report. Application No. EP17204153.5. dated Mar. 26, 2018.

Extended European Search Report for Application No. EP 17204160.0. dated Mar. 22, 2018.

Extended European Search Report for European Application No. 17210308.7 dated Apr. 19, 2018.

US 10,030,586 B2

GEARED TURBOFAN GAS TURBINE ENGINE ARCHITECTURE

CROSS REFERENCE TO RELATED APPLICATION

This application is a continuation-in-part of International Application No. PCT/US13/23559 filed Jan. 29, 2013, which claims priority to of U.S. application Ser. No. 13/645,606 filed Oct. 5, 2012, now U.S. Pat. No. 8,935,913 granted Jan. 20, 2015, which was a continuation in part of U.S. application Ser. No. 13/363,154 filed on Jan. 31, 2012 and claims priority to U.S. Provisional Application No. 61/653,745 filed on May 31, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The inner shaft may also drive the fan section. A direct drive gas turbine engine includes a fan section driven by the inner shaft such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a speed different than the turbine section such that both the turbine section and the fan section can rotate at closer to optimal speeds.

Although geared architectures have improved propulsive efficiency, turbine engine manufacturers continue to seek further improvements to engine performance including improvements to thermal, transfer and propulsive efficiencies.

SUMMARY

A gas turbine engine according to an exemplary embodiment of this disclosure, among other possible things includes a fan including a plurality of fan blades rotatable about an engine axis, a compressor section, a combustor in fluid communication with the compressor section, a turbine section in fluid communication with the combustor, the turbine section including a fan drive turbine and a second turbine, wherein the second turbine is disposed forward of the fan drive turbine and the fan drive turbine includes a plurality of fan drive turbine stages with a ratio between the number of fan blades and the number of fan drive turbine stages is greater than about 2.5, and a speed change system driven by the fan drive turbine for rotating the fan about the engine axis, wherein the fan drive turbine has a first exit area and is configured to rotate at a first speed, the second turbine section has a second exit area and is configured to rotate at a second speed, which is faster than the first speed, wherein the turbine section includes a volume defined within an inner periphery and an outer periphery between a leading edge of a most upstream vane to a trailing edge of a most downstream rotating airfoil and is configured to provide a thrust density greater than 1.5 lbf/in3 and less than or equal to 5.5 lbf/in3 at Sea Level Takeoff Thrust.

In a further embodiment of the foregoing engine, the speed change system comprises a gearbox, and the fan and the fan drive turbine both rotate in a first direction about the engine axis and the second turbine section rotates in a second direction opposite the first direction.

In a further embodiment of the foregoing engine, the speed change system comprises a gearbox, and the fan, the fan drive turbine, and the second turbine section all rotate in a first direction about the engine axis.

In a further embodiment of the foregoing engine, the speed change system comprises a gearbox, and wherein the fan and the second turbine both rotate in a first direction about the engine axis and the fan drive turbine rotates in a second direction opposite the first direction.

In a further embodiment of the foregoing engine, the speed change system comprises a gearbox, and wherein the fan is rotatable in a first direction and the fan drive turbine, and the second turbine section rotate in a second direction opposite the first direction about the engine axis.

In a further embodiment of the foregoing engine, the speed change system comprises a gear reduction having a gear ratio greater than 2.3.

In a further embodiment of the foregoing engine, the fan delivers a portion of air into a bypass duct, and a bypass ratio being defined as the portion of air delivered into the bypass duct divided by the amount of air delivered into the compressor section, with the bypass ratio being greater than 6.0.

In a further embodiment of the foregoing engine, the bypass ratio is greater than 10.0.

In a further embodiment of the foregoing engine, a fan pressure ratio across the fan is less than 1.5.

In a further embodiment of the foregoing engine, the fan has 26 or fewer blades.

In a further embodiment of the foregoing engine, the fan drive turbine section has up to 6 stages.

In a further embodiment of the foregoing engine, the ratio between the number of fan blades and the number of fan drive turbine stages is less than 8.5.

In a further embodiment of the foregoing engine, a pressure ratio across the fan drive turbine is greater than about 5:1.

In a further embodiment of the foregoing engine, the fan drive turbine includes a first aft rotor attached to a first shaft, the second turbine includes a second aft rotor attached to a second shaft, and a first bearing assembly and a second bearing assembly are disposed aft of the combustor, wherein the first bearing assembly is disposed axially aft of a first connection between the first aft rotor and the first shaft, and the second bearing assembly is disposed axially aft of a second connection between the second aft rotor and the second shaft.

In a further embodiment of the foregoing engine, the fan drive turbine includes a first aft rotor attached to a first shaft, the second turbine includes a second aft rotor attached to a second shaft, and a first bearing assembly and a second bearing assembly are disposed aft of the combustor, wherein the first bearing assembly is disposed axially aft of a first connection between the first aft rotor and the first shaft, and the second bearing assembly is disposed axially forward of a second connection between the second aft rotor and the second shaft.

In a further embodiment of the foregoing engine, the fan drive turbine includes a first aft rotor attached to a first shaft, the second turbine includes a second aft rotor attached to a second shaft, and a first bearing assembly and a second bearing assembly are disposed aft of the combustor, wherein the first bearing assembly is disposed axially aft of a first connection between the first aft rotor and the first shaft, and the second bearing assembly is disposed within the annular space defined between the first shaft and the second shaft.

In a further embodiment of the foregoing engine, the fan drive turbine includes a first aft rotor attached to a first shaft, the second turbine includes a second aft rotor attached to a second shaft, and a first bearing assembly and a second bearing assembly are disposed aft of the combustor, wherein the first bearing assembly is disposed axially forward of a first connection between the first aft rotor and the first shaft, and the second bearing assembly is disposed axially aft of a second connection between the second aft rotor and the second shaft.

In a further embodiment of the foregoing engine, the fan drive turbine is one of three turbine rotors, while the other two of the turbine rotors each drives a compressor rotor.

In a further embodiment of the foregoing engine, the fan drive turbine drives a compressor rotor.

In a further embodiment of the foregoing engine, the speed change system is positioned intermediate a compressor rotor driven by the fan drive turbine section and the fan.

In a further embodiment of the foregoing engine, speed change system is positioned intermediate the fan drive turbine and the compressor rotor driven by the fan drive turbine.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
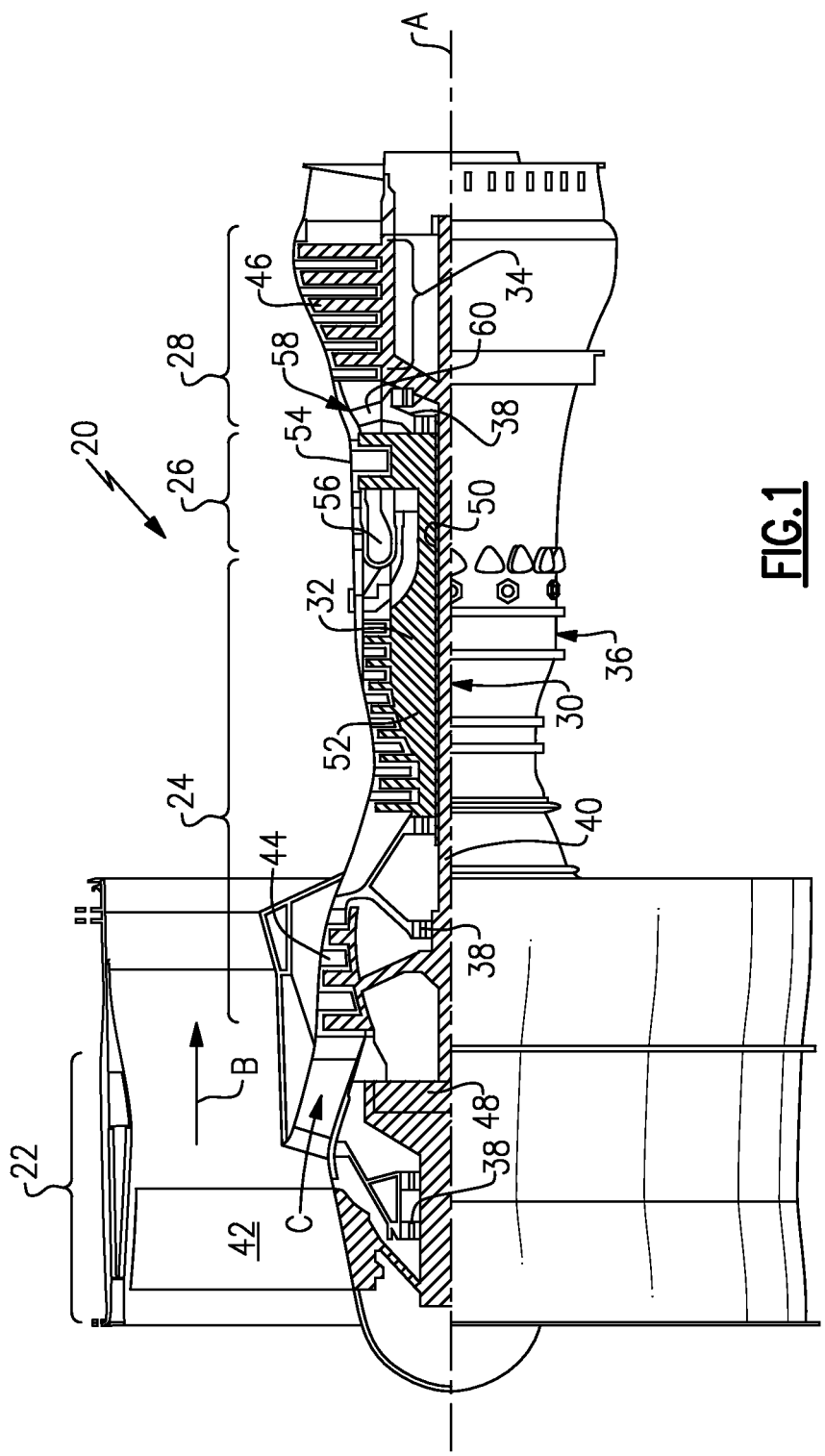
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis such that a low spool enables a low pressure turbine to drive a fan via a gearbox, an intermediate spool enables an intermediate pressure turbine to drive a first compressor of the compressor section, and a high spool enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best cruise fuel consumption relative to the thrust it produces—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum bucket cruise point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7)^{0.5}]$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 18 fan blades. Moreover, in one disclosed embodiment the low pressure turbine 46 includes no more than about 6 turbine stages schematically indicated at 34. In another non-limiting example embodiment the low pressure turbine 46 includes about 3 or more turbine stages. A ratio between the number of fan blades 42 and the number of low pressure turbine stages is between about 2.5 and about 8.5. The example low pressure turbine 46 provides the driving power to rotate the fan section 22 and therefore the relationship between the number of turbine stages 34 in the low pressure turbine 46 and the number of blades 42 in the fan section 22 disclose an example gas turbine engine 20 with increased power transfer efficiency.

Increased power transfer efficiency is provided due in part to the increased use of improved turbine blade materials and manufacturing methods such as directionally solidified castings, and single crystal materials that enable increased turbine speed and a reduced number of stages. Moreover, the example low pressure turbine 46 includes improved turbine disks configurations that further enable desired durability at the higher turbine speeds.

Figure 2:
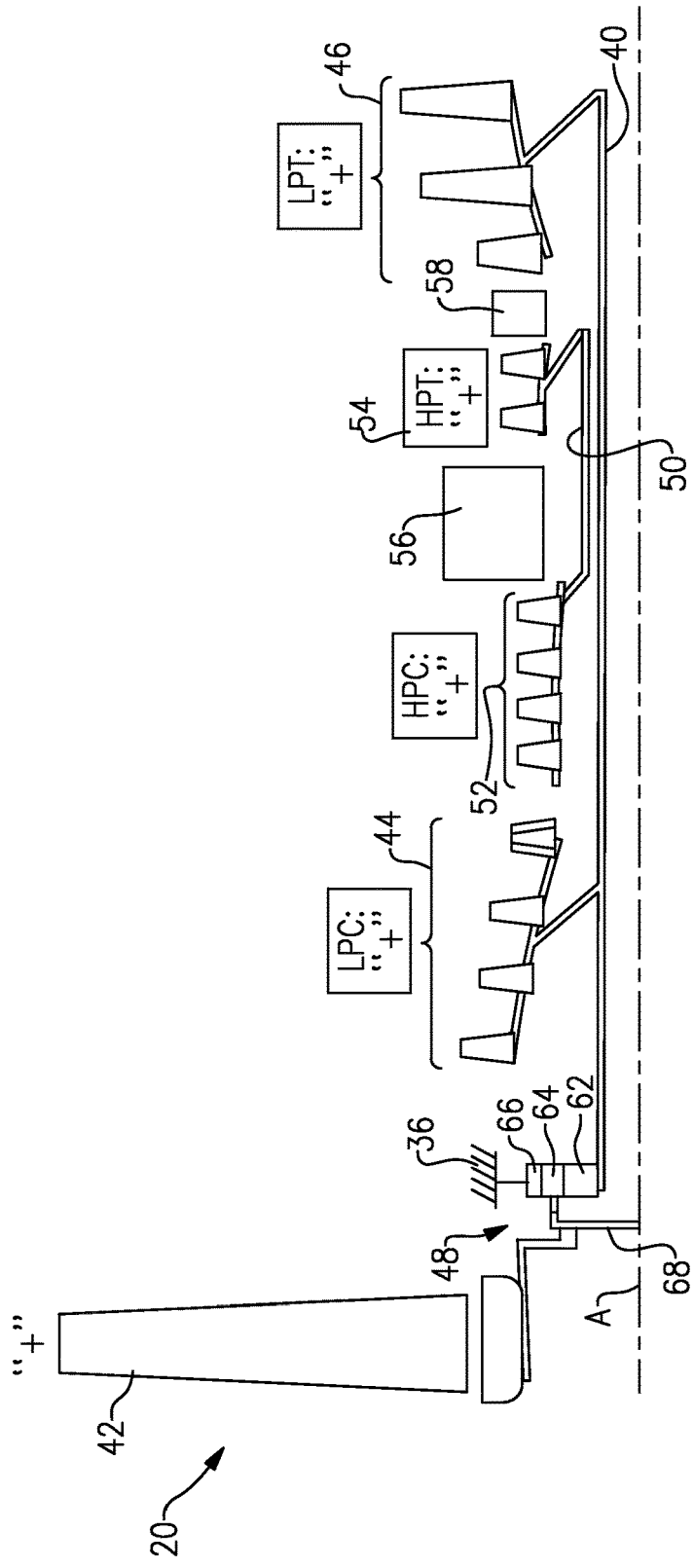
FIG. 2 is a schematic view indicating relative rotation between sections of an example gas turbine engine.
Figure 3:
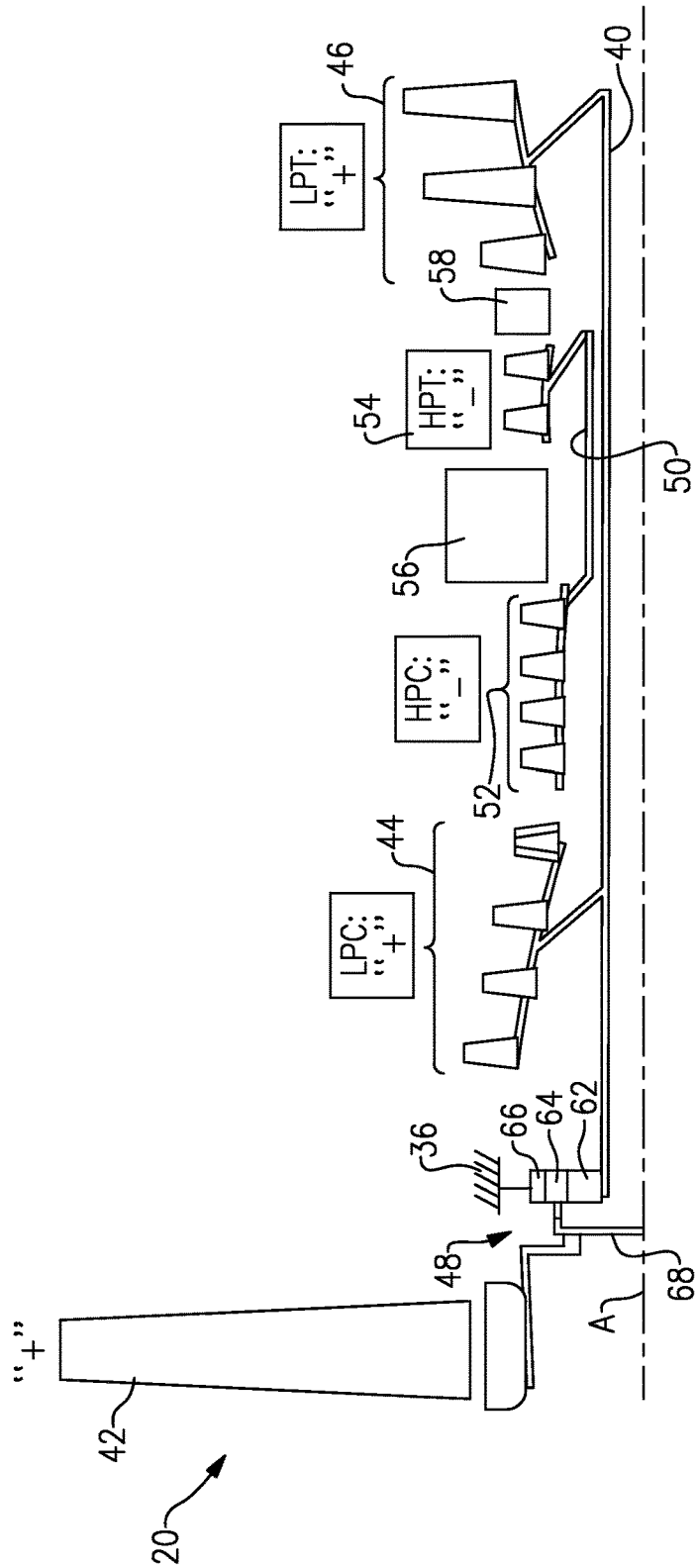
FIG. 3 is another schematic view indicating relative rotation between sections of an example gas turbine engine.

Referring to FIGS. 2 and 3, an example disclosed speed change device is an epicyclical gearbox of a planet type, where the input is to the center "sun" gear 62. Planet gears 64 (only one shown) around the sun gear 62 rotate and are spaced apart by a carrier 68 that rotates in a direction common to the sun gear 62. A ring gear 66, which is non-rotatably fixed to the engine static casing 36 (shown in FIG. 1), contains the entire gear assembly. The fan 42 is attached to and driven by the carrier 68 such that the direction of rotation of the fan 42 is the same as the direction of rotation of the carrier 68 that, in turn, is the same as the direction of rotation of the input sun gear 62.

In the following figures nomenclature is utilized to define the relative rotations between the various sections of the gas turbine engine 20. The fan section is shown with a "+" sign indicating rotation in a first direction. Rotations relative to the fan section 22 of other features of the gas turbine engine are further indicated by the use of either a "+" sign or a "−" sign. The "−" sign indicates a rotation that is counter to that of any component indicated with a "+" sign.

Moreover, the term fan drive turbine is utilized to indicate the turbine that provides the driving power for rotating the blades 42 of the fan section 22. Further, the term "second turbine" is utilized to indicate the turbine before the fan drive turbine that is not utilized to drive the fan 42. In this disclosed example, the fan drive turbine is the low pressure turbine 46, and the second turbine is the high pressure turbine 54. However, it should be understood that other turbine section configurations that include more than the shown high and low pressure turbines 54, 46 are within the contemplation of this disclosure. For example, a three spool engine configuration may include an intermediate turbine (not shown) utilized to drive the fan section 22 and is within the contemplation of this disclosure.

In one disclosed example embodiment (FIG. 2) the fan drive turbine is the low pressure turbine 46 and therefore the fan section 22 and low pressure turbine 46 rotate in a common direction as indicated by the common "+" sign indicating rotation of both the fan 42 and the low pressure turbine 46. Moreover in this example, the high pressure turbine 54 or second turbine rotates in a direction common with the fan drive turbine 46. In another example shown in FIG. 3, the high pressure turbine 54 or second turbine rotates in a direction opposite the fan drive turbine (low pressure turbine 46) and the fan 42.

Counter rotating the low pressure compressor 44 and the low pressure turbine 46 relative to the high pressure compressor 52 and the high pressure turbine 54 provides certain efficient aerodynamic conditions in the turbine section 28 as the generated high speed exhaust gas flow moves from the high pressure turbine 54 to the low pressure turbine 46. The relative rotations in the compressor and turbine sections provide approximately the desired airflow angles between the sections, which improves overall efficiency in the turbine section 28, and provides a reduction in overall weight of the turbine section 28 by reducing or eliminating airfoils or an entire row of vanes.

Figure 4:
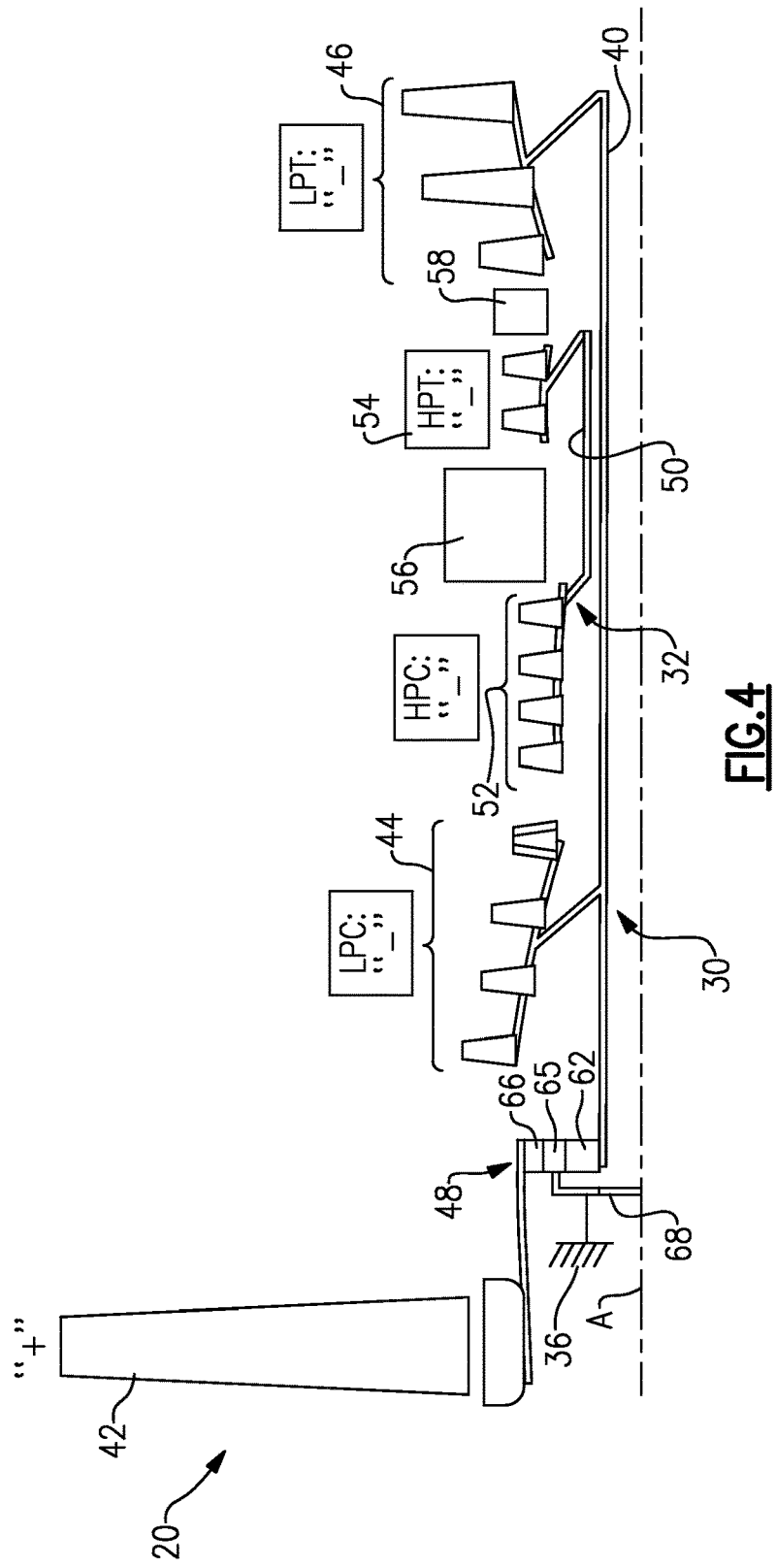
FIG. 4 is another schematic view indicating relative rotation between sections of an example gas turbine engine.
Figure 5:
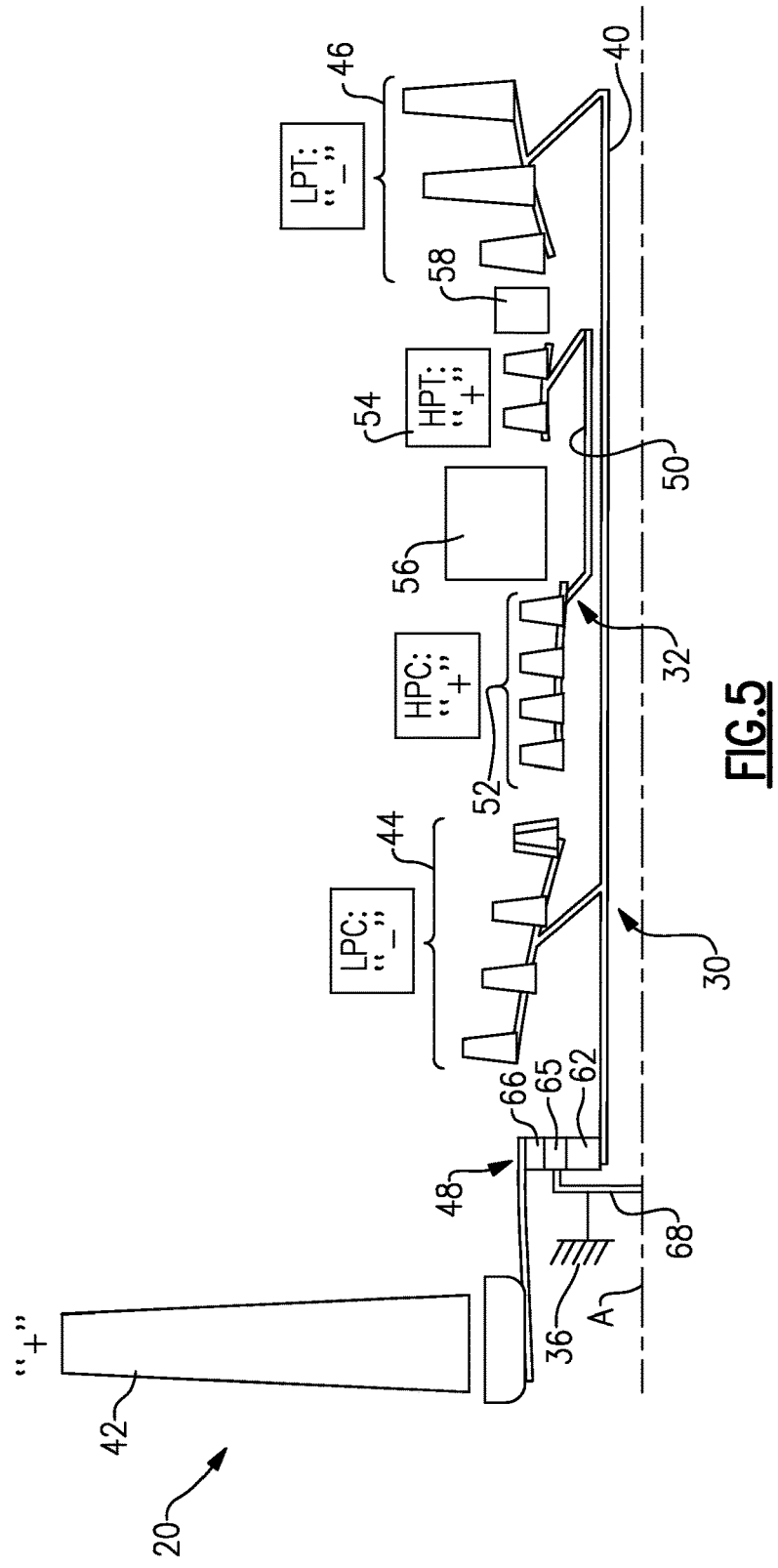
FIG. 5 is another a schematic view indicating relative rotation between sections of an example gas turbine engine.

Referring to FIGS. 4 and 5, another example disclosed speed change device is an epicyclical gearbox referred to as a star type gearbox, where the input is to the center "sun" gear 62. Star gears 65 (only one shown) around the sun gear 62 rotate in a fixed position around the sun gear and are spaced apart by a carrier 68 that is fixed to a static casing 36 (best shown in FIG. 1). A ring gear 66 that is free to rotate contains the entire gear assembly. The fan 42 is attached to and driven by the ring gear 66 such that the direction of rotation of the fan 42 is opposite the direction of rotation of the input sun gear 62. Accordingly, the low pressure compressor 44 and the low pressure turbine 46 rotate in a direction opposite rotation of the fan 42.

In one disclosed example embodiment shown in FIG. 4, the fan drive turbine is the low pressure turbine 46 and therefore the fan 42 rotates in a direction opposite that of the low pressure turbine 46 and the low pressure compressor 44. Moreover in this example the high spool 32 including the high pressure turbine 54 and the high pressure compressor 52 rotate in a direction counter to the fan 42 and common with the low spool 30 including the low pressure compressor 44 and the fan drive turbine 46.

In another example gas turbine engine shown in FIG. 5, the high pressure or second turbine 54 rotates in a direction common with the fan 42 and counter to the low spool 30 including the low pressure compressor 44 and the fan drive turbine 46.

Figure 6:
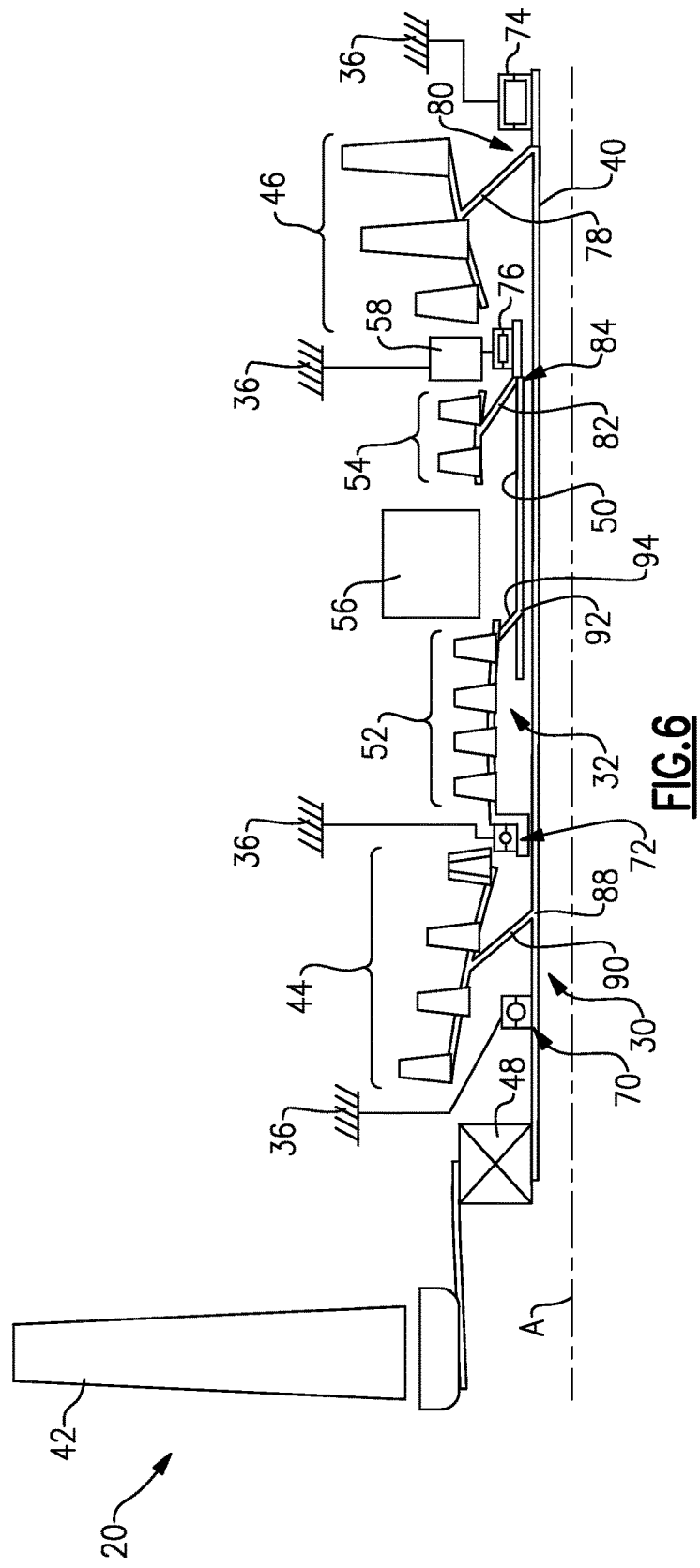
FIG. 6 is a schematic view of a bearing configuration supporting rotation of example high and low spools of the example gas turbine engine.

Referring to FIG. 6, the bearing assemblies near the forward end of the shafts in the engine at locations 70 and 72, which bearings support rotation of the inner shaft 40 and the outer shaft 50, counter net thrust forces in a direction parallel to the axis A that are generated by the rearward load of low pressure turbine 46 and the high pressure turbine 54, minus the high pressure compressor 52 and the low pressure compressor 44, which also contribute to the thrust forces acting on the corresponding low spool 30 and the high spool 32.

In this example embodiment, a first forward bearing assembly 70 is supported on a portion of the static structure schematically shown at 36 and supports a forward end of the inner shaft 40. The example first forward bearing assembly 70 is a thrust bearing and controls movement of the inner shaft 40 and thereby the low spool 30 in an axial direction. A second forward bearing assembly 72 is supported by the static structure 36 to support rotation of the high spool 32 and substantially prevent movement along in an axial direction of the outer shaft 50. The first forward bearing assembly 70 is mounted to support the inner shaft 40 at a point forward of a connection 88 of a low pressure compressor rotor 90. The second forward bearing assembly 72 is mounted forward of a connection referred to as a hub 92 between a high pressure compressor rotor 94 and the outer shaft 50. A first aft bearing assembly 74 supports the aft portion of the inner shaft 40. The first aft bearing assembly 74 is a roller bearing and supports rotation, but does not provide resistance to movement of the shaft 40 in the axial direction. Instead, the aft bearing 74 allows the shaft 40 to expand thermally between its location and the bearing 72. The example first aft bearing assembly 74 is disposed aft of a connection hub 80 between a low pressure turbine rotor 78 and the inner shaft 40. A second aft bearing assembly 76 supports the aft portion of the outer shaft 50. The example second aft bearing assembly 76 is a roller bearing and is supported by a corresponding static structure 36 through the mid turbine frame 58 which transfers the radial load of the shaft across the turbine flow path to ground 36. The second aft bearing assembly 76 supports the outer shaft 50 and thereby the high spool 32 at a point aft of a connection hub 84 between a high pressure turbine rotor 82 and the outer shaft 50.

In this disclosed example, the first and second forward bearing assemblies 70, 72 and the first and second aft bearing assemblies 74, 76 are supported to the outside of either the corresponding compressor or turbine connection hubs 80, 88 to provide a straddle support configuration of the corresponding inner shaft 40 and outer shaft 50. The straddle support of the inner shaft 40 and the outer shaft 50 provide a support and stiffness desired for operation of the gas turbine engine 20.

Figure 7:
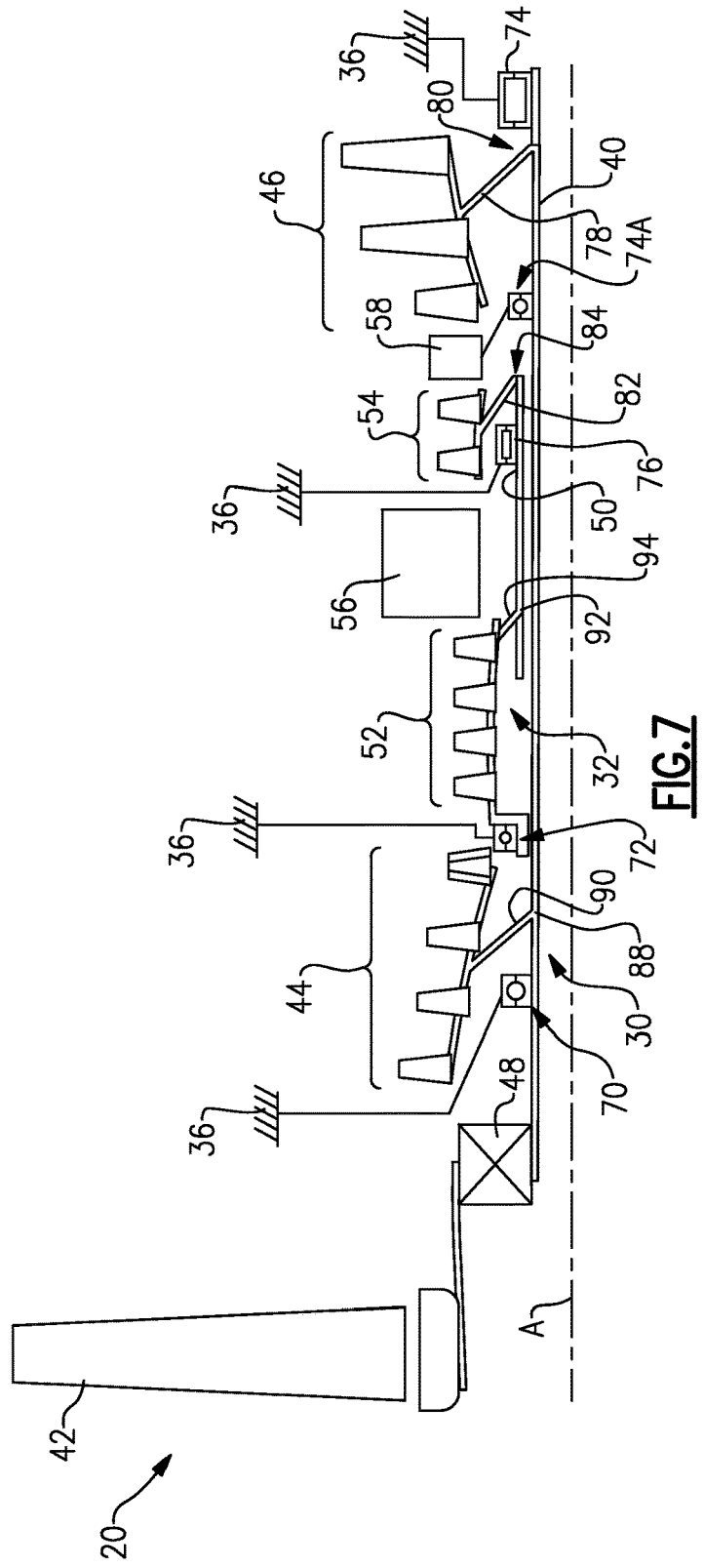
FIG. 7 is another schematic view of a bearing configuration supporting rotation of example high and low spools of the example gas turbine engine.

Referring to FIG. 7, another example shaft support configuration includes the first and second forward bearing assemblies 70, 72 disposed to support the forward portion of the corresponding inner shaft 40 and outer shaft 50. The first aft bearing 74 is disposed aft of the connection 80 between the rotor 78 and the inner shaft 40. The first aft bearing 74 is a roller bearing and supports the inner shaft 40 in a straddle configuration. The straddle configuration can require additional length of the inner shaft 40 and therefore an alternate configuration referred to as an overhung configuration can be utilized. In this example the outer shaft 50 is supported by the second aft bearing assembly 76 that is disposed forward of the connection 84 between the high pressure turbine rotor 82 and the outer shaft 50. Accordingly, the connection hub 84 of the high pressure turbine rotor 82 to the outer shaft 50 is overhung aft of the bearing assembly 76. This positioning of the second aft bearing 76 in an overhung orientation potentially provides for a reduced length of the outer shaft 50.

Moreover the positioning of the aft bearing 76 may also eliminate the need for other support structures such as the mid turbine frame 58 as both the high pressure turbine 54 is supported at the bearing assembly 76 and the low pressure turbine 46 is supported by the bearing assembly 74. Optionally the mid turbine frame strut 58 can provide an optional roller bearing 74A which can be added to reduce vibratory modes of the inner shaft 40.

Figure 8:
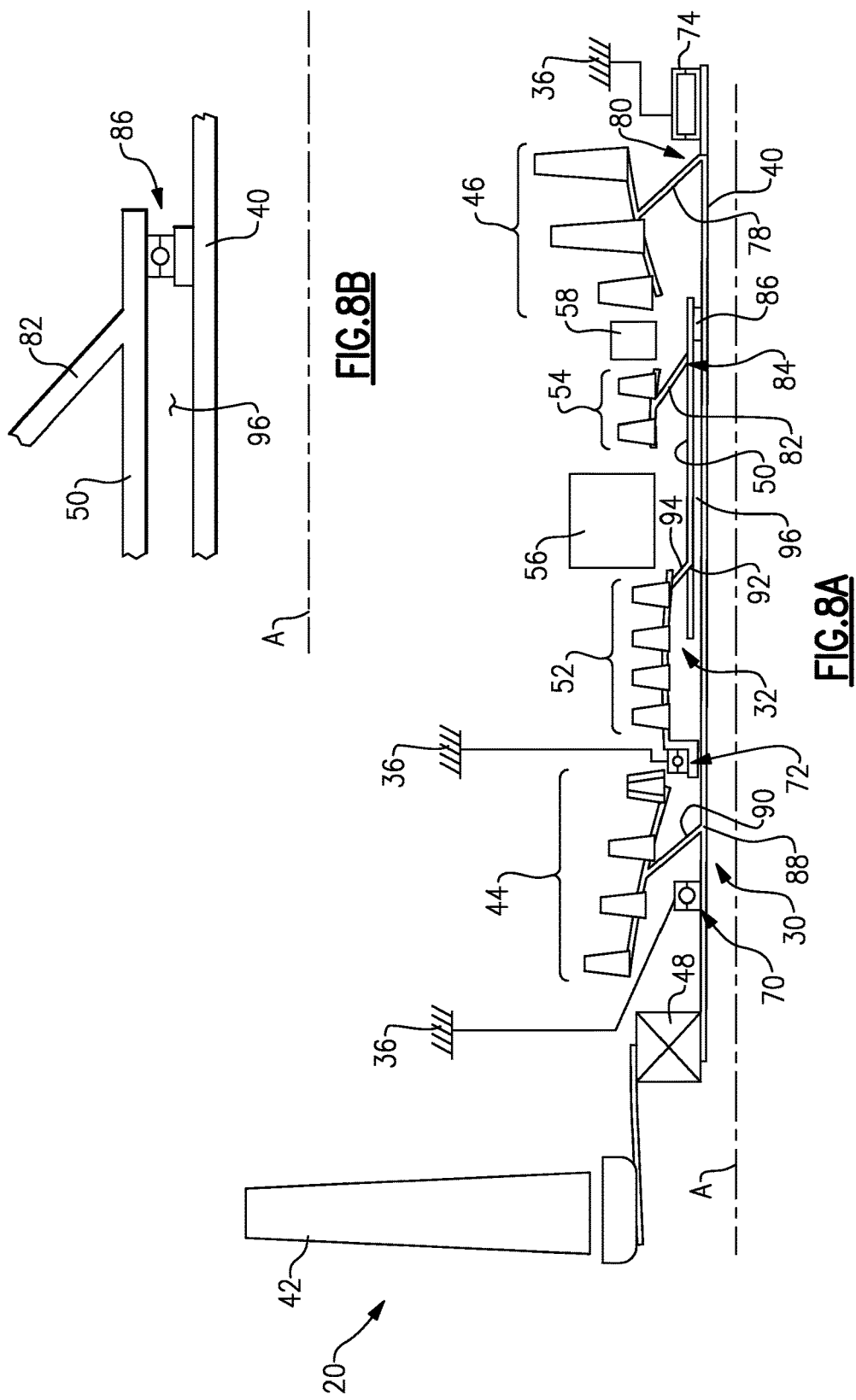
FIG. 8A is another schematic view of a bearing configuration supporting rotation of example high and low spools of the example gas turbine engine.
FIG. 8B is an enlarged view of the example bearing configuration shown in FIG. 8A.

Referring to FIGS. 8A and 8B, another example shaft support configuration includes the first and second forward bearing assemblies 70, 72 disposed to support corresponding forward portions of each of the inner shaft 40 and the outer shaft 50. The first aft bearing 74 provides support of the outer shaft 40 at a location aft of the connection 80 in a straddle mount configuration. In this example, the aft portion of the outer shaft 50 is supported by a roller bearing assembly 86 supported within a space 96 defined between an outer surface of the inner shaft 40 and an inner surface of the outer shaft 50.

Figure 9:
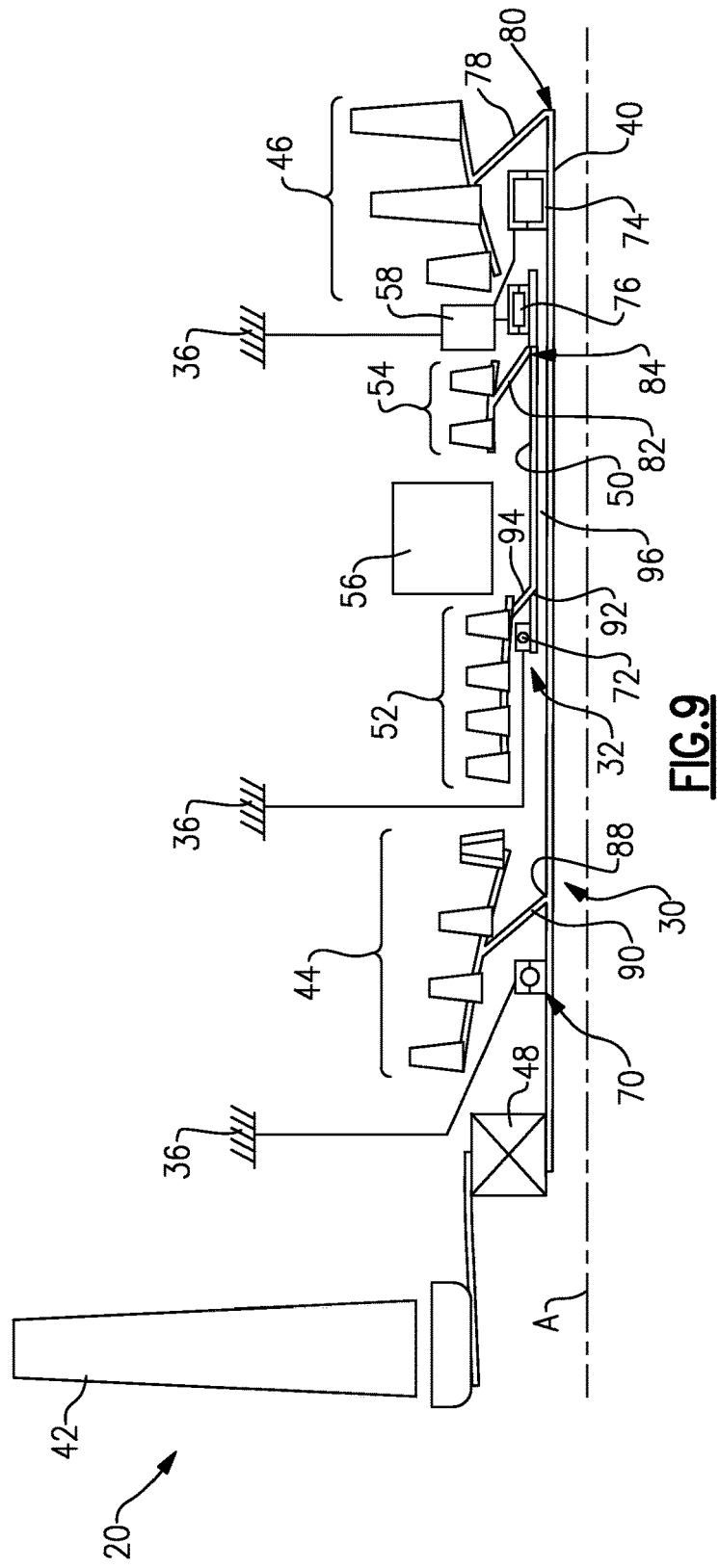
FIG. 9 is another schematic view of a bearing configuration supporting rotation of example high and low spools of the example gas turbine engine.

The roller bearing assembly 86 supports the aft portion of the outer shaft 50 on the inner shaft 40. The use of the roller bearing assembly 86 to support the outer shaft 50 eliminates the requirements for support structures that lead back to the static structure 36 through the mid turbine frame 58. Moreover, the example bearing assembly 86 can provide both a reduced shaft length, and support of the outer shaft 50 at a position substantially in axial alignment with the connection hub 84 for the high pressure turbine rotor 82 and the outer shaft 50. As appreciated, the bearing assembly 86 is positioned aft of the hub 82 and is supported through the rearmost section of shaft 50. Referring to FIG. 9, another example shaft support configuration includes the first and second forward bearing assemblies 70, 72 disposed to support corresponding forward portions of each of the inner shaft 40 and the outer shaft 50. The first aft bearing assembly 74 is supported at a point along the inner shaft 40 forward of the connection 80 between the low pressure turbine rotor 78 and the inner shaft 40.

Positioning of the first aft bearing 74 forward of the connection 80 can be utilized to reduce the overall length of the engine 20. Moreover, positioning of the first aft bearing assembly 74 forward of the connection 80 provides for support through the mid turbine frame 58 to the static structure 36. Furthermore, in this example the second aft bearing assembly 76 is deployed in a straddle mount configuration aft of the connection 84 between the outer shaft 50 and the rotor 82. Accordingly, in this example, both the first and second aft bearing assemblies 74, 76 share a common support structure to the static outer structure 36. As appreciated, such a common support feature provides for a less complex engine construction along with reducing the overall length of the engine. Moreover, the reduction or required support structures will reduce overall weight to provide a further improvement in aircraft fuel burn efficiency.

Figure 10:
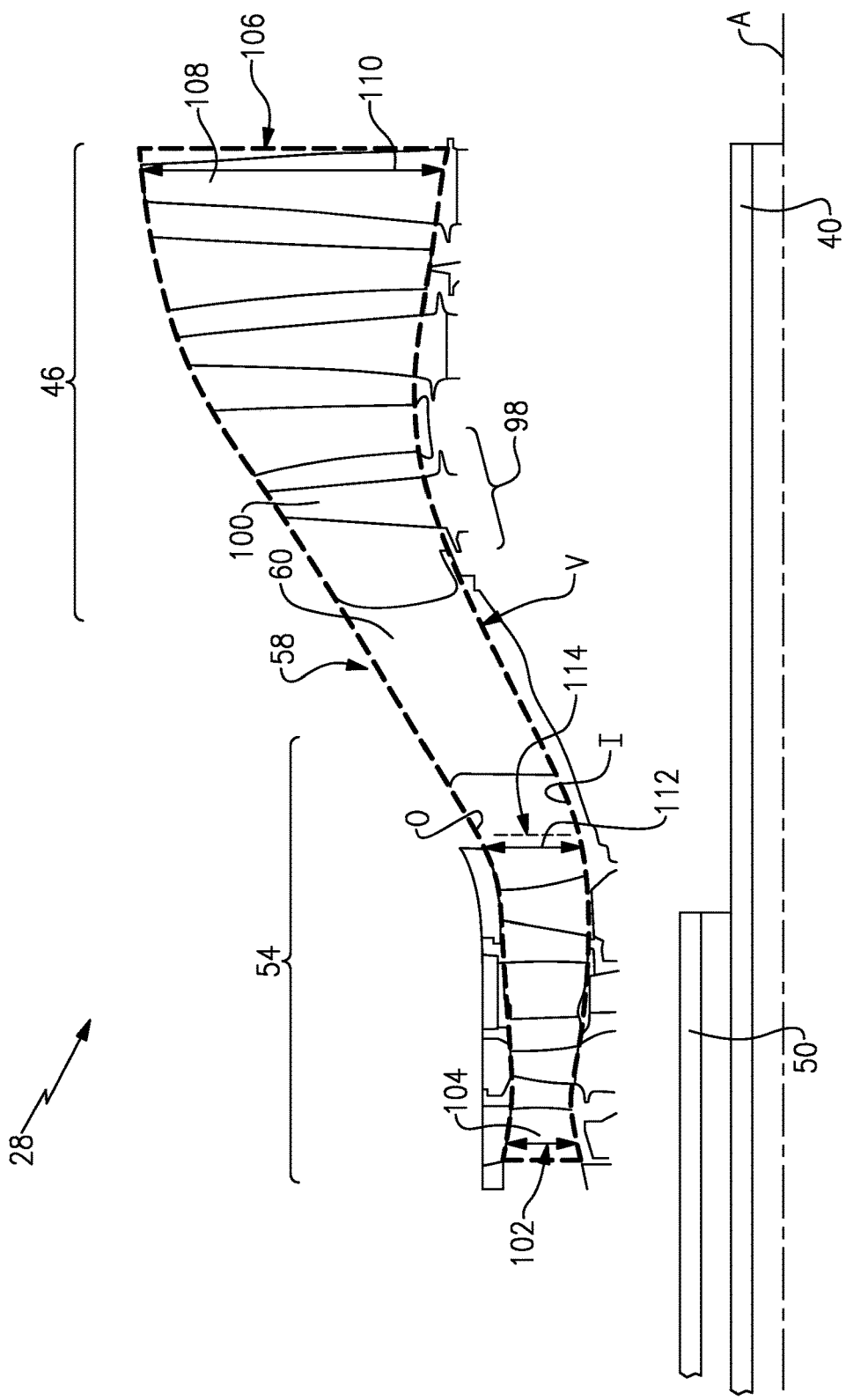
FIG. 10 is a schematic view of an example compact turbine section.

Referring to FIG. 10, a portion of the example turbine section 28 is shown and includes the low pressure turbine 46 and the high pressure turbine 54 with the mid turbine frame 58 disposed between an outlet of the high pressure turbine and the low pressure turbine. The mid turbine frame 58 and vane 60 are positioned to be upstream of the first stage 98 of the low pressure turbine 46. While a single vane 60 is illustrated, it should be understood these would be plural vanes 60 spaced circumferentially. The vane 60 redirects the flow downstream of the high pressure turbine 54 as it approaches the first stage 98 of the low pressure turbine 46. As can be appreciated, it is desirable to improve efficiency to have flow between the high pressure turbine 54 and the low pressure turbine 46 redirected by the vane 60 such that the flow of expanding gases is aligned as desired when entering the low pressure turbine 46. Therefore vane 60 may be an actual airfoil with camber and turning, that aligns the airflow as desired into the low pressure turbine 46.

By incorporating a true air-turning vane 60 into the mid turbine frame 58, rather than a streamlined strut and a stator vane row after the strut, the overall length and volume of the combined turbine sections 46, 54 is reduced because the vane 60 serves several functions including streamlining the mid turbine frame 58, protecting any static structure and any oil tubes servicing a bearing assembly from exposure to heat, and turning the flow entering the low pressure turbine 46 such that it enters the rotating airfoil 100 at a desired flow angle. Further, by incorporating these features together, the overall assembly and arrangement of the turbine section 28 is reduced in volume.

The above features achieve a more or less compact turbine section volume relative to the prior art including both high and low pressure turbines 54, 46. Moreover, in one example, the materials for forming the low pressure turbine 46 can be improved to provide for a reduced volume. Such materials may include, for example, materials with increased thermal and mechanical capabilities to accommodate potentially increased stresses induced by operating the low pressure turbine 46 at the increased speed. Furthermore, the elevated speeds and increased operating temperatures at the entrance to the low pressure turbine 46 enables the low pressure turbine 46 to transfer a greater amount of energy, more efficiently to drive both a larger diameter fan 42 through the geared architecture 48 and an increase in compressor work performed by the low pressure compressor 44.

Alternatively, lower priced materials can be utilized in combination with cooling features that compensate for increased temperatures within the low pressure turbine 46. In three exemplary embodiments a first rotating blade 100 of the low pressure turbine 46 can be a directionally solidified casting blade, a single crystal casting blade or a hollow, internally cooled blade. The improved material and thermal properties of the example turbine blade material provide for operation at increased temperatures and speeds, that in turn provide increased efficiencies at each stage that thereby provide for use of a reduced number of low pressure turbine stages. The reduced number of low pressure turbine stages in turn provide for an overall turbine volume that is reduced, and that accommodates desired increases in low pressure turbine speed.

The reduced stages and reduced volume provide improve engine efficiency and aircraft fuel burn because overall weight is less. In addition, as there are fewer blade rows, there are: fewer leakage paths at the tips of the blades; fewer leakage paths at the inner air seals of vanes; and reduced losses through the rotor stages.

The example disclosed compact turbine section includes a power density, which may be defined as thrust in pounds force (lbf) produced divided by the volume of the entire turbine section 28. The volume of the turbine section 28 may be defined by an inlet 102 of a first turbine vane 104 in the high pressure turbine 54 to the exit 106 of the last rotating airfoil 108 in the low pressure turbine 46, and may be expressed in cubic inches. The static thrust at the engine's flat rated Sea Level Takeoff condition divided by a turbine section volume is defined as power density and a greater power density may be desirable for reduced engine weight. The sea level take-off flat-rated static thrust may be defined in pounds-force (lbf), while the volume may be the volume from the annular inlet 102 of the first turbine vane 104 in the high pressure turbine 54 to the annular exit 106 of the downstream end of the last airfoil 108 in the low pressure turbine 46. The maximum thrust may be Sea Level Takeoff Thrust "SLTO thrust" which is commonly defined as the flat-rated static thrust produced by the turbofan at sea-level.

The volume V of the turbine section may be best understood from FIG. 10. As shown, the mid turbine frame 58 is disposed between the high pressure turbine 54, and the low pressure turbine 46. The volume V is illustrated by a dashed line, and extends from an inner periphery I to an outer periphery O. The inner periphery is defined by the flow path of rotors, but also by an inner platform flow paths of vanes. The outer periphery is defined by the stator vanes and outer air seal structures along the flowpath. The volume extends from a most upstream end of the vane 104, typically its leading edge, and to the most downstream edge of the last rotating airfoil 108 in the low pressure turbine section 46. Typically this will be the trailing edge of the airfoil 108.

The power density in the disclosed gas turbine engine is much higher than in the prior art. Eight exemplary engines are shown below which incorporate turbine sections and overall engine drive systems and architectures as set forth in this application, and can be found in Table I as follows:

TABLE 1

| Engine | Thrust SLTO (lbf) | Turbine section volume from the Inlet | Thrust/turbine section volume (lbf/in³) |
|---|---|---|---|
| 1 | 17,000 | 3,859 | 4.40 |
| 2 | 23,300 | 5,330 | 4.37 |
| 3 | 29,500 | 6,745 | 4.37 |
| 4 | 33,000 | 6,745 | 4.84 |
| 5 | 96,500 | 31,086 | 3.10 |
| 6 | 96,500 | 62,172 | 1.55 |
| 7 | 96,500 | 46,629 | 2.07 |
| 8 | 37,098 | 6,745 | 5.50 |

Thus, in example embodiments, the power density would be greater than or equal to about 1.5 lbf/in³. More narrowly, the power density would be greater than or equal to about 2.0 lbf/in³. Even more narrowly, the power density would be greater than or equal to about 3.0 lbf/in³. More narrowly, the power density is greater than or equal to about 4.0 lbf/in³. Also, in embodiments, the power density is less than or equal to about 5.5 lbf/in³.

Engines made with the disclosed architecture, and including turbine sections as set forth in this application, and with modifications within the scope of this disclosure, thus provide very high efficient operation, and increased fuel efficiency and lightweight relative to their thrust capability.

An exit area 112 is defined at the exit location for the high pressure turbine 54 and an exit area 110 is defined at the outlet 106 of the low pressure turbine 46. The gear reduction 48 (shown in FIG. 1) provides for a range of different rotational speeds of the fan drive turbine, which in this example embodiment is the low pressure turbine 46, and the fan 42 (FIG. 1). Accordingly, the low pressure turbine 46, and thereby the low spool 30 including the low pressure compressor 44 may rotate at a very high speed. Low pressure turbine 46 and high pressure turbine 54 operation may be evaluated looking at a performance quantity which is the exit area for the respective turbine section multiplied by its respective speed squared. This performance quantity ("PQ") is defined as:

$$PQ_{ltp}=(A_{lpt} \times V_{lpt}^2) \quad \text{Equation 1:}$$

$$PQ_{bpt}=(A_{hpt} \times V_{hpt}^2) \quad \text{Equation 2:}$$

where $A_{lpt}$ is the area 110 of the low pressure turbine 46 at the exit 106, $V_{lpt}$ is the speed of the low pressure turbine section; $A_{hpt}$ is the area of the high pressure turbine 54 at the exit 114, and where $V_{hpt}$ is the speed of the high pressure turbine 54.

Thus, a ratio of the performance quantity for the low pressure turbine 46 compared to the performance quantify for the high pressure turbine 54 is:

$$(A_{lpt} \times V_{lpt}^2)/(A_{hpt} \times V_{hpt}^2)=PQ_{lpt}/PQ_{hpt} \quad \text{Equation 3:}$$

In one turbine embodiment made according to the above design, the areas of the low and high pressure turbines 46, 54 are 557.9 in² and 90.67 in², respectively. Further, the speeds of the low and high pressure turbine 46, 54 are 10179 rpm and 24346 rpm, respectively. Thus, using Equations 1 and 2 above, the performance quantities for the example low and high pressure turbines 46, 54 are:

$$PQ_{ltp}=(A_{lpt} \times V_{lpt}^2)=(557.9 \text{ in}^2)$$
$$(10179 \text{ rpm})^2=57805157673.9 \text{ in}^2 \text{ rpm}^2 \quad \text{Equation 1:}$$

$$PQ_{hpt}=(A_{hpt} \times V_{hpt}^2)=(90.67 \text{ in}^2)$$
$$(24346 \text{ rpm})^2=53742622009.72 \text{ in}^2 \text{ rpm}^2 \quad \text{Equation 2:}$$

and using Equation 3 above, the ratio for the low pressure turbine section to the high pressure turbine section is:

$$\text{Ratio}=PQ_{lpt}/PQ_{hpt}=57805157673.9 \text{ in}^2 \text{ rpm}^2/$$
$$53742622009.72 \text{ in}^2 \text{ rpm}^2=1.075$$

In another embodiment, the ratio is greater than about 0.5 and in another embodiment the ratio is greater than about 0.8. With $PQ_{ltp}/PQ_{hpt}$ ratios in the 0.5 to 1.5 range, a very efficient overall gas turbine engine is achieved. More narrowly, $PQ_{ltp}/PQ_{hpt}$ ratios of above or equal to about 0.8 provides increased overall gas turbine efficiency. Even more narrowly, $PQ_{ltp}/PQ_{hpt}$ ratios above or equal to 1.0 are even more efficient thermodynamically and from an enable a reduction in weight that improves aircraft fuel burn efficiency. As a result of these $PQ_{ltp}/PQ_{hpt}$ ratios, in particular, the turbine section 28 can be made much smaller than in the prior art, both in diameter and axial length. In addition, the efficiency of the overall engine is greatly increased.

Figure 11:
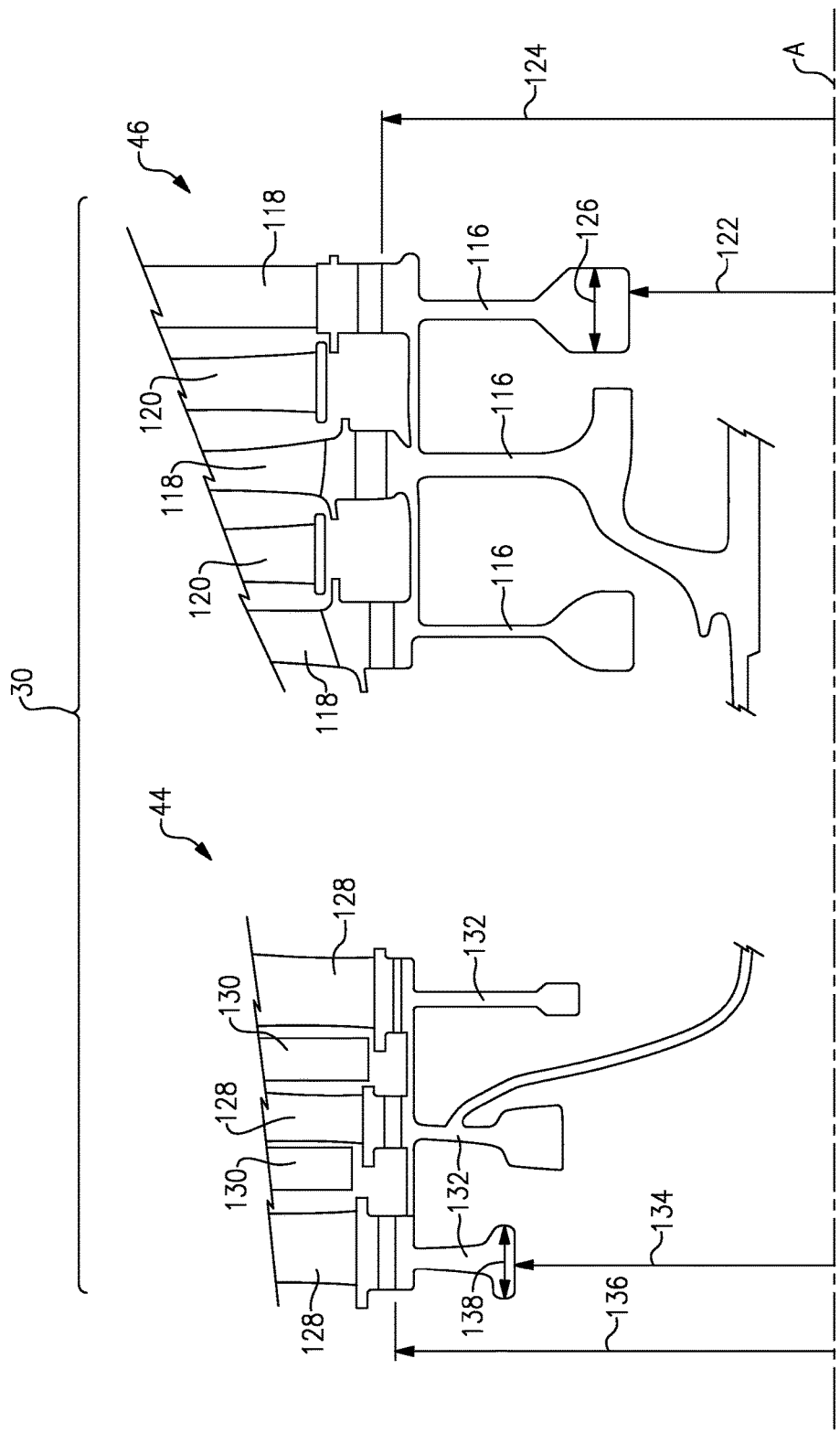
FIG. 11 is a schematic cross-section of example stages for the disclosed example gas turbine engine.

Referring to FIG. 11, portions of the low pressure compressor 44 and the low pressure turbine 46 of the low spool 30 are schematically shown and include rotors 116 of the low pressure turbine 46 and rotors 132 of the low pressure compressor 44. Each of the rotors 116 includes a bore radius 122, a live disk radius 124 and a bore width 126 in a direction parallel to the axis A. The rotor 116 supports turbine blades 118 that rotate relative to the turbine vanes 120. The low pressure compressor 44 includes rotors 132 including a bore radius 134, a live disk radius 136 and a bore width 138. The rotor 132 supports compressor blades 128 that rotate relative to vanes 130.

The bore radius 122 is that radius between an inner most surface of the bore and the axis. The live disk radius 124 is the radial distance from the axis of rotation A and a portion of the rotor supporting airfoil blades. The bore width 126 of the rotor in this example is the greatest width of the rotor and is disposed at a radial distance spaced apart form the axis A determined to provide desired physical performance properties.

Figure 12:
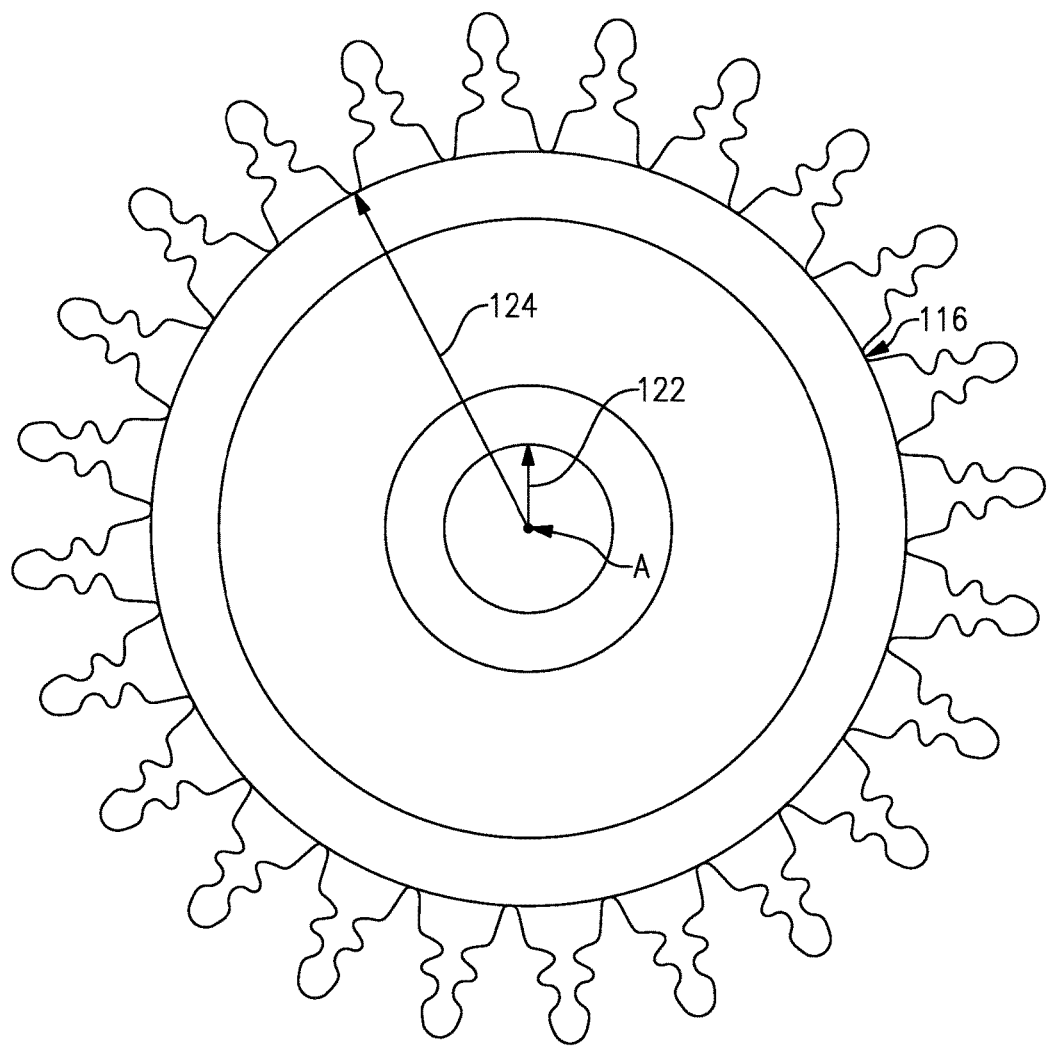
FIG. 12 is a schematic view an example turbine rotor perpendicular to the axis or rotation.

The rotors for each of the low compressor 44 and the low pressure turbine 46 rotate at an increased speed compared to prior art low spool configurations. The geometric shape including the bore radius, live disk radius and the bore width are determined to provide the desired rotor performance in view of the mechanical and thermal stresses selected to be imposed during operation. Referring to FIG. 12, with continued reference to FIG. 11, a turbine rotor 116 is shown to further illustrate the relationship between the bore radius 126 and the live disk radius 124. Moreover, the relationships disclosed are provided within a known range of materials commonly utilized for construction of each of the rotors.

Accordingly, the increased performance attributes and performance are provided by desirable combinations of the disclosed features of the various components of the described and disclosed gas turbine engine embodiments.

Figure 13:
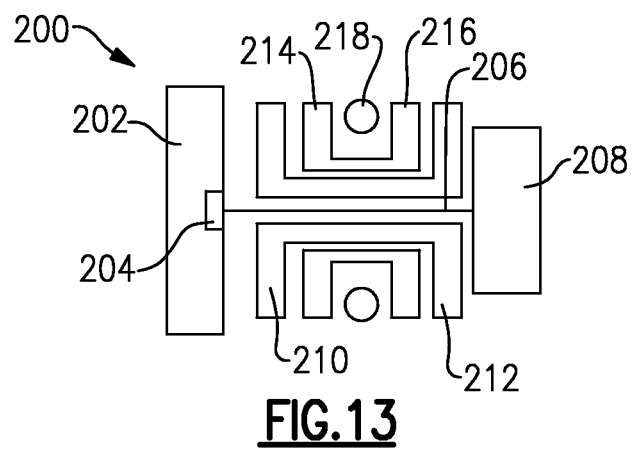
FIG. 13 is another embodiment of an example gas turbine engine for use with the present invention.

FIG. 13 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 14:
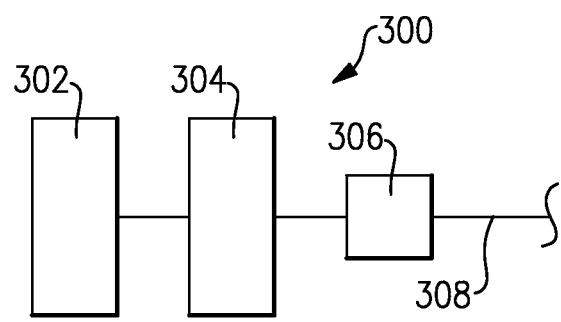
FIG. 14 is yet another embodiment of an example gas turbine engine for use with the present invention.

FIG. 14 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

The embodiments 200, 300 of FIG. 13 or 14 may be utilized with the features disclosed above.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
    a fan including a plurality of fan blades rotatable about an engine axis;
    a compressor section;
    a combustor in fluid communication with the compressor section;
    a turbine section in fluid communication with the combustor, the turbine section including a fan drive turbine and a second turbine, wherein the second turbine is disposed forward of the fan drive turbine and the fan drive turbine includes a plurality of fan drive turbine stages with a ratio between a number of fan blades and a number of fan drive turbine stages is greater than 2.5 and less than 8.5; and
    a speed change system driven by the fan drive turbine for rotating the fan about the engine axis;
    wherein the fan drive turbine has a first exit area and is rotatable at a first speed, the second turbine section has a second exit area and is rotatable at a second speed, which is faster than the first speed,
    wherein the turbine section includes a volume defined within an inner periphery and an outer periphery between a leading edge of a most upstream vane to a trailing edge of a most downstream rotating airfoil and provides a thrust density greater than 1.5 lbf/in3 and less than or equal to 5.5 lbf/in3 at Sea Level Takeoff Thrust.

2. The gas turbine engine as recited in claim 1, wherein the speed change system comprises a gearbox, and wherein the fan and the fan drive turbine both rotate in a first direction about the engine axis and the second turbine section rotates in a second direction opposite the first direction.

3. The gas turbine engine as recited in claim 1, wherein the speed change system comprises a gearbox, and wherein the fan, the fan drive turbine, and the second turbine section all rotate in a first direction about the engine axis.

4. The gas turbine engine as recited in claim 1, wherein the speed change system comprises a gearbox, and wherein the fan and the second turbine both rotate in a first direction about the engine axis and the fan drive turbine rotates in a second direction opposite the first direction.

5. The gas turbine engine as recited in claim 1, wherein the speed change system comprises a gearbox, and wherein the fan is rotatable in a first direction and the fan drive turbine, and the second turbine section rotate in a second direction opposite the first direction about the engine axis.

6. The gas turbine engine as set forth in claim 1, wherein said fan has 26 or fewer blades.

7. The gas turbine engine as set forth in claim 6, wherein said fan drive turbine section has up to 6 stages.

8. The gas turbine engine as recited in claim 1, wherein the fan drive turbine includes a first aft rotor attached to a first shaft, the second turbine includes a second aft rotor attached to a second shaft, and a first bearing assembly and a second bearing assembly are disposed aft of the combustor, wherein the first bearing assembly is disposed axially aft of a first connection between the first aft rotor and the first shaft, and the second bearing assembly is disposed axially aft of a second connection between the second aft rotor and the second shaft.

9. The gas turbine engine as recited in claim 1, wherein the fan drive turbine includes a first aft rotor attached to a first shaft, the second turbine includes a second aft rotor attached to a second shaft, and a first bearing assembly and a second bearing assembly are disposed aft of the combustor, wherein the first bearing assembly is disposed axially aft of a first connection between the first aft rotor and the first shaft, and the second bearing assembly is disposed axially forward of a second connection between the second aft rotor and the second shaft.

10. The gas turbine engine as recited in claim 1, wherein the fan drive turbine includes a first aft rotor attached to a first shaft, the second turbine includes a second aft rotor attached to a second shaft, and a first bearing assembly and a second bearing assembly are disposed aft of the combustor, wherein the first bearing assembly is disposed axially aft of a first connection between the first aft rotor and the first shaft, and the second bearing assembly is disposed within an annular space defined between the first shaft and the second shaft.

11. The gas turbine engine as recited in claim 1, wherein the fan drive turbine includes a first aft rotor attached to a first shaft, the second turbine includes a second aft rotor attached to a second shaft, and a first bearing assembly and a second bearing assembly are disposed aft of the combustor, wherein the first bearing assembly is disposed axially forward of a first connection between the first aft rotor and the first shaft, and the second bearing assembly is disposed axially aft of a second connection between the second aft rotor and the second shaft.

12. The gas turbine engine as recited in claim 1, wherein said fan drive turbine is one of three turbine rotors, while the other two of said turbine rotors each drives a compressor rotor.

13. The gas turbine engine as recited in claim 12, wherein said fan drive turbine drives a compressor rotor.

14. The gas turbine engine as recited in claim 13, wherein said speed change system is positioned intermediate a compressor rotor driven by said fan drive turbine section and said fan.

15. The gas turbine engine as recited in claim 13, wherein said speed change system is positioned intermediate said fan drive turbine and said compressor rotor driven by said fan drive turbine.

* * * * *